United States Patent
Scheinberg

[15] 3,693,327
[45] Sept. 26, 1972

[54] FILTERS AND CARBON MONOXIDE INDICATORS

[72] Inventor: Israel Herbert Scheinberg, 5447 Palisade Avenue, Bronx, N.Y. 10471

[22] Filed: Dec. 30, 1970

[21] Appl. No.: 102,869

Related U.S. Application Data

[63] Continuation-in-part of Ser. No. 85,057, Oct. 29, 1970, abandoned.

[52] U.S. Cl. ..................55/274, 23/254, 55/302, 55/354, 55/387, 55/390, 55/522, 131/261 R, 131/263, 260/314
[51] Int. Cl. .............................................B01d 23/24
[58] Field of Search ..........23/254; 55/74, 59, 62, 68, 55/97, 274, 387, 302, 522, 354, 528, 390; 210/500; 260/314; 131/261-263

[56] References Cited

UNITED STATES PATENTS

| 1,716,479 | 6/1929 | Bilsky | 131/261 B |
| 2,153,568 | 4/1939 | Johnson | 23/254 |
| 2,739,913 | 3/1956 | Liesen | 131/17 R |
| 3,297,062 | 1/1967 | VanSwaay | 23/254 |
| 3,332,215 | 7/1967 | Revell | 55/352 |

FOREIGN PATENTS OR APPLICATIONS

| 532,913 | 11/1956 | Canada | 260/314 |
| 167,845 | 2/1906 | Germany | 267/ |

OTHER PUBLICATIONS

Organic Chemistry by Paul Karrer, 4th edition (1950) published by the Elbevier Publishing Co., Inc., page 734

Primary Examiner—Bernard Nozick
Attorney—David J. Moscovitz et al.

[57] ABSTRACT

A filter wherein the filter medium is selected from the group consisting of amorphous hemoglobin, crystalline hemoglobin, amorphous heme and crystalline heme in the presence of a stoichiometric excess, with regard to the iron in said hemoglobin or heme, of a suitable reductant. The filter is adapted to remove carbon monoxide from air or the gases inhaled by a smoker. The filter medium assumes a predetermined color and infrared absorptivity characteristic when exposed to a predetermined quantity of carbon monoxide. Support for said filter medium may be provided with windows for visual access to said filter medium and automatic means may be provided for replacing said filter medium in response to detection of said color or infrared characteristics. Hemoglobin or heme in the presence of a suitable reductant may also serve as a carbon monoxide detector.

39 Claims, 3 Drawing Figures

PATENTED SEP 26 1972 3,693,327
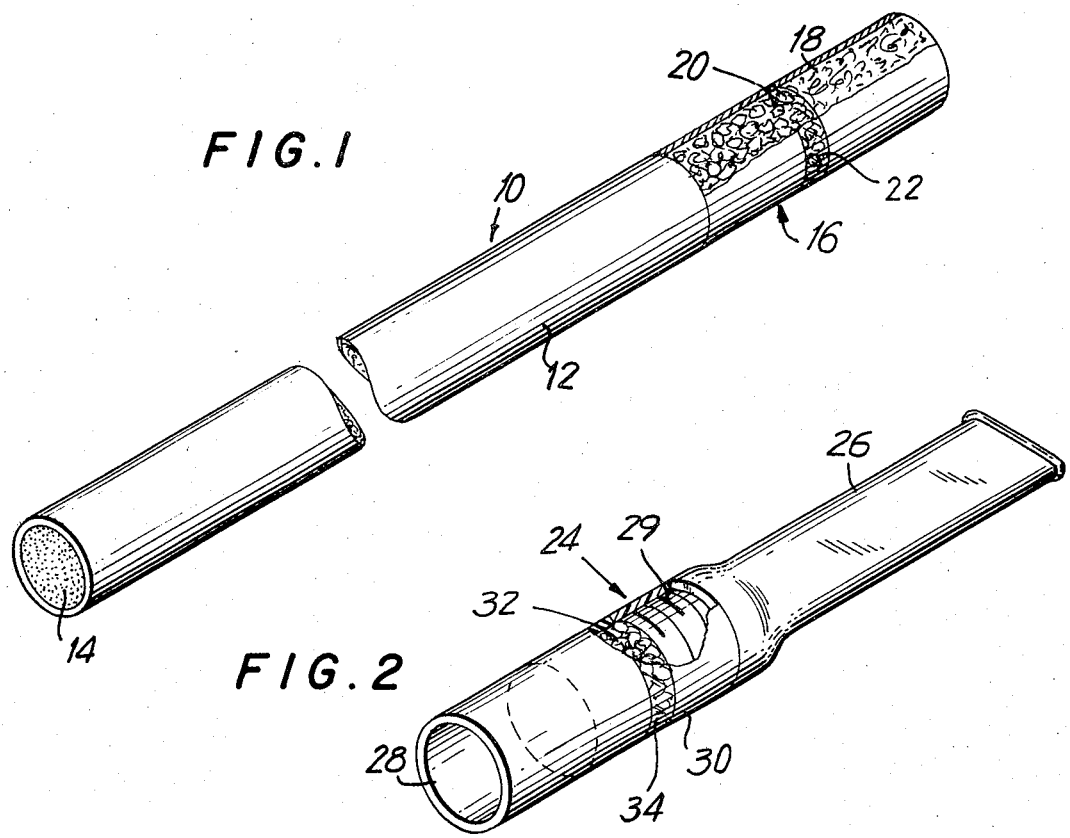
FIG.1
FIG.2
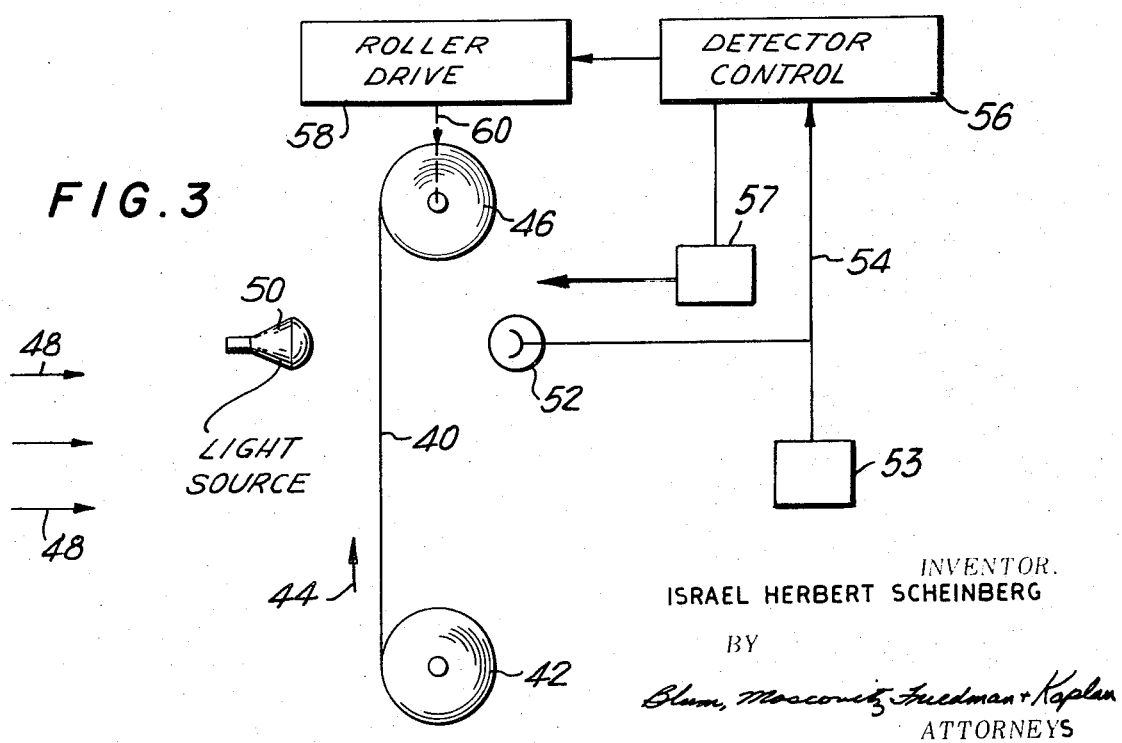
FIG.3
INVENTOR.
ISRAEL HERBERT SCHEINBERG
BY
Blum, Moscovitz, Friedman & Kaplan
ATTORNEYS

FILTERS AND CARBON MONOXIDE INDICATORS

BACKGROUND OF THE INVENTION

This is a continuation-in-part application of my copending application for FILTERS Ser. No. 85,057 filed on about Oct. 29, 1970 now abandoned.

This invention relates generally to filters suitable for removing carbon monoxide from gases passed therethrough and to devices for detecting excess amounts of carbon monoxide in the air. The inhaling of excessive quantities of carbon monoxide can be injurious to health, impair both mental and motor capabilities, and even cause death. Thus, studies have found that where the product of hours of exposure and parts of carbon monoxide per 10,000 parts of air equals 15, there is danger to life. One common source of carbon monoxide is from the gases inhaled from smoking. It has been found that cigarette smoke contains sufficient carbon monoxide to interfere with intellectual functioning. Further, it is also likely that the carbon monoxide produced by cigarettes is a contributory factor in the increased incidence of coronary artery disease and occlusion associated with smoking.

Even non-smokers are frequently exposed to potentially excessive quantities of carbon monoxide since carbon monoxide is a substantial air pollutant produced by automobiles, internal and external combustion engines, and many industrial processes. Thus, guards and workers in automobile tunnels and even passengers in automobiles may be exposed to excessive quantities of carbon monoxide. By providing a filter incorporating a filter medium formed from amorphous hemoglobin, crystalline hemoglobin, amorphous heme, or crystalline heme, an effective filter for controlling the quantity of carbon monoxide is provided, said filter also offering material practical advantages.

SUMMARY OF THE INVENTION

Generally speaking, in accordance with the invention, an air filter medium is provided selected from the group consisting of amorphous hemoglobin, crystalline hemoglobin, amorphous heme and crystalline heme in the presence of a stoichiometric excess, with regard to the iron in said hemoglobin or heme, of a suitable reductant. The filter medium is prepared so that it will assume a distinctive color, namely cherry red, upon exposure to a predetermined quantity of carbon monoxide. The medium may also be prepared so that, upon exposure to a predetermined quantity of carbon monoxide, it will absorb a lesser proportion of infrared rays applied thereto, as compared with the proportion of infrared rays absorbable before such exposure.

Said filter medium may be incorporated in a filter for interposition between tobacco for smoking and the smoker. In such case, means may be provided for supporting said filter medium said support means including a window portion aligned with said filter medium to permit visual examination of said filter medium. Said window may be positioned in alignment with at least a portion of said filter medium adapted to be proximate the smoker. Said support means may include a chamber for receiving the filter medium and means for providing access to said chamber for the replacement of said filter medium. The filter medium may be formed from amorphous or crystalline hemoglobin at either acid or alkaline pH, as desired, for the filtering of selected other constituents of the inhaled gases from the gases inhaled by the smoker.

The filter medium according to the invention may also be incorporated in an air filter, in which support means may also be provided for carrying said filter medium. Said support means may be provided with window means to permit viewing of said filter medium. Detecting means for detecting a predetermined change in selected characteristics of said filter medium indicative of the exposure of said filter medium to a predetermined quantity of carbon monoxide may be provided. Said detecting means may be light sensitive means adapted to detect the changes in color of said filter medium or infrared sensitive means adapted to detect changes in infrared wave absorption characteristics of said filter medium.

Automatic filter medium replacement means may be provided responsive to the detecting means and operative to replace the filter medium upon detection by said detecting means of the exposure of said filter medium to a predetermined quantity of carbon monoxide. For such applications, the filter medium may be formed from amorphous hemoglobin or heme as a sheet. Said support means may include a pair of spaced roller means for supporting a portion of said sheet filter medium in the path of said air, the support means further including means for coordinately rotating said pair of roller means for positioning successive incremental lengths of said sheet filter medium in the path of said air.

In addition, the filter according to the invention may include blower means for the selective direction of oxygen or relatively carbon monoxide-free air through said filter medium for the displacement of carbon monoxide therefrom, resulting in the regeneration of said filter medium.

A carbon monoxide detecting device may be provided using hemoglobin or heme in the presence of said reductant. Such a device would be provided with an alarm actuated if an excess of carbon monoxide were detected.

Accordingly, it is an object of this invention to provide a filter medium specifically adapted to filter carbon monoxide.

Another object of the invention is to provide a filter which provides a visual or optical indication of the saturation of its ability to function.

A further object of the invention is to provide a filter adapted for automatically detecting the saturation of the filter medium thereof and for the automatic replacement of said filter medium.

Still another object of the invention is to provide an improved filter for interposition between tobacco for smoking and the smoker, and which may be incorporated in the filter of a cigarette or in a separate cigarette holder.

Still other objects and advantages of the invention will in part be obvious and will in part be apparent from the specification and drawings.

The invention accordingly comprises the features of construction, combination of elements and the article possessing the features, properties, and the relation of elements which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which:

FIG. 1 is partially sectioned perspective view of a cigarette incorporating a filter according to the invention;

FIG. 2 is a partially sectioned perspective view of a cigarette holder incorporating a filter according to the invention; and FIG. 3 is a schematic representation of a filter arrangement according to the invention.

DESCRIPTION OF THE PREFERRED EMBODIMENTS

Referring now to FIG. 1, a cigarette 10 is depicted consisting of a conventional paper wrapping 12 which contains tobacco 14 and a filter element 16. In the embodiment shown in FIG. 1, said filter element consists of two portions, a conventional filter member 18 formed, for example, of a fibrous material, and a filter medium member 20 formed of a material selected from the group consisting of amorphous hemoglobin, crystalline hemoglobin, amorphous heme, and crystalline heme, maintained in the reduced, ferrous form by a stoichiometric excess of a suitable reductant. Hemoglobin is a respiratory protein of animal red blood cells. Hemoglobin, in its natural, reduced, ferrous state is readily oxidized in air to form ferric or methemoglobin. The reductant, such as ascorbic acid, methylene blue, or other organic compound or metal having suitable oxidation-reduction potentials relative to that of methemoglobin-hemoglobin, is required to prevent this oxidation and to preserve the hemoglobin in its reduced state. Each molecule of hemoglobin can combine with four molecules of oxygen or four molecules of carbon monoxide to form oxyhemoglobin or carboxyhemoglobin, respectively. As used herein, hemoglobin refers to both deoxygenated hemoglobin and oxyhemoglobin but not methehemoglobin. Hemoglobin consists of approximately 94 percent globin, the protein portion, and approximately 6 percent heme (ferrous protoporphyrin). Heme may be separated from hemoglobin at pH 2 by the use of acetone in accordance with a well known process. It is necessary to keep heme (or hemin) in the reduced or ferrous form by the addition of a reductant such as, but not limited to, dithionite. As used herein, heme refers to both heme and hemin in the reduced form.

Hemoglobin and heme have approximately 250 times the chemical affinity and molecular capacity for carbon monoxide as for molecular oxygen. Hemoglobin combines with carbon monoxide to form carboxyhemoglobin.

Where hemoglobin, either as oxyhemoglobin or in the deoxygenated form, or heme, either as heme or as hemin, is interposed in a stream of gas or air so that it is in contact with the flowing gas stream, carbon monoxide is removed from that air or gas stream until its concentration is reduced to approximately 1/250th of that of oxygen or until the capacity of the hemoglobin or heme for carbon monoxide has been reached, whichever occurs first. At sea level and at room temperature, approximately 1.3 cubic centimeters of carbon monoxide can be absorbed by every gram of hemoglobin. Heme would have a much greater capacity for carbon monoxide per unit weight of material than hemoglobin since the molecular weight of heme is less than 1,000 compared with a molecular weight of approximately 66,000 for hemoglobin. This makes heme's capacity for carbon monoxide, on a weight basis, approximately 70 times as great as the capacity of hemoglobin for carbon monoxide.

Hemoglobin is readily available from animal sources. About 23 million cattle are slaughtered each year in the United States under the Department of Agriculture's supervision supplying approximately 15 liters of red cells per animal, or about 5 kilograms of hemoglobin. Proportionally less inspected hemoglobin is available from hogs and sheep.

The process for producing hemoglobin from whole animal blood is well known in the art. Red blood cells are separated from whole anticoagulated animal blood. The cells are separated, washed with normal saline and lysed with distilled water after being washed 3 to 5 times. The further processing depends on whether amorphous or crystalline hemoglobin is desired. The resulting solution of hemoglobin may be freeze dried to give amorphous hemoglobin if the size of the particles desired makes this a suitable form. In the alternative, crystallization of the hemoglobin may be carried out by adjusting the pH, temperature, ionic strength, concentration of hemoglobin and the concentration of ionic and nonionic precipitants of hemoglobin such as, but not limited to ammonium sulphate and ethanol, in accordance with well known procedures. The size of the hemoglobin crystals may be varied by changing one or more of these variables to produce a filter medium of the desired configuration. For use according to the invention, the crystalline or amorphous hemoblobin should be prepared and kept in the presence of a stoichiometric excess of the reductant. Similarly, heme can be produced in amorphous or crystalline form by means of well known processes.

In addition to their great affinity for carbon monoxide, hemoglobin and heme offer other substantial advantages as a filter medium. Thus, the reaction between hemoglobin and carbon monoxide to produce carboxyhemoglobin is extremely fast, permitting the filtering of carbon monoxide from a stream of gas moving rapidly through the filter medium. Further, when hemoglobin, either in the oxygenated or deoxygenated form is converted to carboxyhemoglobin, the material undergoes a distinct color change in which the characteristic red colors of deoxygenated or oxygenated hemoglobin are converted to a characteristic cherry red color. This significant color change permits both visual and photoelectric determination of the exhaustion of the capacity of the hemoglobin to absorb carbon monoxide. However, the color difference between deoxygenated hemoglobin and carboxyhemoglobin is greater than the color difference between oxyhemoglobin and carboxyhemoglobin and the deoxygenated form is preferred where visual detection of color change is desired. Still a further feature of the filter medium according to the invention is the relative transparency of carboxyhemoglobin when compared with the absorption characteristics of hemoglobin and oxyhemoglobin to infrared. Thus, at a wavelength of 0.8 microns, hemoglobin and oxyhemoglobin exhibit an $\epsilon_{mM}$ of 0.2 while carboxyhemoglobin exhibits an $\epsilon_{mM}$ of 0.018. This unique characteristic can also be utilized to provide an indication of saturation of the filter medium according to the invention.

Still a further feature of the filter medium according to the invention is the fact that the binding of carbon monoxide to hemoglobin, though much tighter than that of oxygen, is nevertheless reversible. Thus, it is possible to regenerate an exhausted filter according to the invention by flushing said filter with large volumes of oxygen or relatively carbon monoxide-free air. When so flushed, the hemoglobin is again suitable for removing carbon monoxide from gases passed therethrough. the absorption Still another advantage of the filter medium according to the invention is the fact that hemoglobin, although a protein, can be freed of all small molecules which may be unpleasantly aromatic, by, for example, dialysis or chromatography. Since hemoglobin itself is not volatile, when so freed of volatile components, the hemoglobin would contribute no aroma to gases which pass through a filter incorporating said filter medium.

The drawing illustrates several embodiments of filters incorporating the filter medium according to the invention. Referring again to FIG. 1, the filter medium member 20 incorporated in cigarette 10 preferably consists of crystalline hemoglobin in the presence of a stoichiometric excess of a suitable reductant, which would provide minimum interference to the passage of gases therethrough, and therefore minimum interference with the "draw" of the cigarette. In the embodiment of the cigarette filter shown in FIG. 1, the paper wrapper 12 is provided with a transparent plastic window portion 22 which permits visual examination of filter medium member 20 so that the smoker can readily determine when said filter medium member is saturated with carbon monoxide, and therefore permitting carbon monoxide to pass through the filter to the smoker. Window portion 22 is preferably located at the end of filter medium member 20 proximate to the smoker, as shown in FIG. 1, since that portion of the filter medium member would be the last to become saturated. The construction of the filter of FIG. 1 also isolates the filter medium according to the invention from the mouth of the user, an important arrangement for aesthetic purposes. An alternate construction might be to dispose the filter member medium at the end of filter 16 but shielded from the mouth of the user by a transparent plastic membrane which would permit the passage of gases therethrough. This construction would also provide a "window" through which the filter medium could be visually examined.

When utilized as a filter for smoking articles, the filter medium according to the invention can be adapted to filter constituents of cigarette smoke other than carbon monoxide. Thus, if hemoglobin is amorphously precipitated or crystallized in an acid solution of, for example, pH 4, the alpha, epsilon, or histidyl amino groups of the protein would be in the charged $-N^+-$ form. In such a form, the hemoglobin of the filter medium would absorb negatively charged organic and volatile material such as acetic acid, formic acid and the like.

On the other hand, if the amorphously precipitated or crystallized hemoglobin were formed in an alkaline solution of, for example, pH 9, the carboxyl groups of the protein would be present in a negatively charged form. This form of the filter medium according to the invention would absorb amines and other positively charged or potentially positively charged aromatic small molecules present in the gas passing through the filter medium.

A further embodiment of a filter suitable for use with smoking products such as cigarettes or cigars is shown in FIG. 2. In this embodiment a separate cigarette holder 24 is provided having a conventional mouth piece portion 26 and a hollow tip portion 28 adapted to receive the cigar or cigarette. Intermediate said mouthpiece and tip portions is a filter support portion 30 defining a chamber within which is disposed a filter medium member 32 produced in accordance with the teachings of the invention. Holder 24 may be separated into two parts, one being tip portion 26 having on one end thereof an area of reduced outer diameter formed with a threaded outer surface 29. The inner surface of one end of filter support portion 30 is formed with corresponding threads. In this manner, access is readily provided to the chamber within filter support portion 30 for substitution of filter medium member 32 upon the exhaustion thereof. A transparent window 34 is formed in the wall of filter support portion 30 to permit visual examination of the filter medium member so that the smoker will know when said filter medium member must be replaced. A similar construction can be utilized in pipes.

From the foregoing, it is apparent that the filter medium according to the invention provides a particularly advantageous filter for smoking articles. Recent studies have indicated that the smoke of a cigarette contains more than two percent carbon monoxide, and that inhaled smoke contains approximately 400 parts per million of carbon monoxide. Accordingly, a filter medium member including 300 milligrams of amorphous or crystalline hemoglobin could absorb virtually all of the carbon monoxide resulting from the burning of such a cigarette which would otherwise be inhaled. A proportionately lesser amount of heme would be required for this purpose, but due to difficulties in maintaining heme in the reduced (ferrous) state, hemoglobin is preferred. This quantity of hemoglobin could readily be incorporated in existing cigarette filters or in separate cigarette or cigar holders or pipes. Further, deoxygenated hemoglobin is preferred due to the greater color contrast with carboxyhemoglobin, as compared with oxyhemoglobin, and the small quantity of oxygen in inhaled tobacco smoke.

The filter medium according to the invention is not limited to smoking articles. Said filter medium may be interposed in a mask utilized by individuals working in atmospheres high in carbon monoxide, such as those working in garages, automobile tunnels, or in any atmosphere where combustion of almost any organic matter takes place. The support for the filter medium in such a mask could also include a transparent window at the end of the filter closest to the user, so that exhaustion of the hemoglobin can be readily observed. The filter medium according to the invention can also be incorporated in any air filter, such as a filter positioned in a vent of an automobile or in any system wherein streams of air are displaced or recirculated by fans or the like. Such systems would include both air conditioning, ventilating, purifying, and forced-air heating systems utilized in living and working quarters as well as in automobiles. One example of a filter arrangement incorporating the filter medium according to the invention is shown in FIG. 3. In said arrangement, the filter medium is formed as a sheet 40 mounted on a supply roll 42 and adapted for advancement in the direction of arrow 44 to take up roll 46. The filter medium may be formed in sheet or membrane form by permitting a solution of hemoglobin or heme to dry on a thin metal plate of the type utilized for drying glossy photograph prints. The resulting sheet or membrane of hemoglobin or heme can be coiled on supply roll 42 for continuous or intermittent advancement past a stream of air, such as the stream exemplified by arrows 48 of FIG. 3. The arrangement of FIG. 3 also includes provision for taking advantage of the distinctive color or infrared characteristics of the filter medium according to the invention as described above. Thus, a light source 50 may be provided for directing a stream of monochromatic light through the filter medium sheet to a photocell 52. When the color of the filter membrane assumes the characteristic color of carboxyhemoglobin, the quantity of light detected by photocell 52 will reach a predetermined level, as reflected by the signal passed along line 54 to the detector control 56 shown schematically in FIG. 3. Said detector control may be of any conventional design adapted to respond to the level of signal on line 54. The detector is adapted to actuate a roller drive 58 when said signal level reaches a predetermined value. The said roller drive is mechanically coupled to take up roller 46, as shown schematically by dashed line 60 to advance the sheet 40 of filter medium 40 an incremental distance in the direction of arrow 44 to expose a fresh section of said filter medium to air stream 48. In this manner, a filter arrangement is provided which automatically replaces an exhausted filter medium without the necessity for visual monitoring. In a similar manner, light source 50 may be replaced by a source of infrared rays. In the alternative, the output signal of photocell 52 can be connected to a signalling device 53 to provide an alarm when the quantity of carbon monoxide to which the filter medium has been exposed reaches a predetermined quantity.

In still a further embodiment of the arrangement according to the invention, detector control 56 can be utilized to actuate a blower system 57 adapted to direct a stream of oxygen or relatively carbon monoxide-free air against the filter medium for the regeneration thereof. Or, in the alternative, during the evening hours when air is relatively free of carbon monoxide, such blowers could be automatically actuated. In still another embodiment of the arrangement in FIG. 3, the filter medium according to the invention can be carried by a supporting membrane or sheet of filter material adapted to filter other pollutants in the atmosphere. Further, other arrangements for automatically replacing the filter medium upon detection of saturation may be utilized in the arrangement according to the invention if desired.

In still another embodiment, the alarm and detection mechanism of FIG. 3 can be applied to detect an excess of carbon monoxide in the atmosphere of an enclosed space such as a room or the inside of a vehicle, without being coupled to a filtering arrangement. In such an embodiment a quantity of reduced hemoglobin or heme is exposed to the atmosphere in said room or in the air stream of a heating, cooling or air circulating system, and positioned relative to a detection device such as light source 50 and photocell 52 for the detection of changes in color or infrared absorbtion characteristics therein. The photocell would be coupled to a suitable alarm for signalling the presence of a dangerous excess of carbon monoxide. For such an embodiment, a solution of hemoglobin or heme, as well as crystalline or amorphous hemoglobin or heme could be used, so long as the hemoglobin or heme is in the presence of a stoichiometric excess of a suitable reductant.

It will thus be seen that the objects set forth above, and those made apparent from the preceding description are efficiently attained, and, since certain changes may be made in the above constructions and articles without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An air filter medium selected from the group consisting of amorphous hemoglobin, crystalline hemoglobin, amorphous heme and crystalline heme, including a reducing agent which maintains the hemoglobin or heme in the ferrous state and being in a stoichiometric excess, with regard to the iron in said hemoglobin or heme.

2. A filter medium as recited in claim 1, wherein said filter medium is hemoglobin and said reducing agent is ascorbic acid.

3. A filter medium as recited in claim 1, wherein said filter medium is hemoglobin and said reducing agent is methylene blue.

4. A filter medium as recited in claim 1, wherein said medium is prepared so that, upon exposure to a predetermined quantity of carbon monoxide, it will absorb a lesser proportion of infrared rays applied thereto, as compared with the proportion of infrared rays absorbable before such exposure.

5. A filter medium as recited in claim 1, wherein said medium is prepared so that it will assume a distinctive color upon exposure to a predetermined quantity of carbon monoxide.

6. A filter medium as recited in claim 5, wherein said color is a cherry red.

7. A filter for interposition between tobacco for smoking and the smoker comprising a filter medium selected from the group consisting of amorphous hemoglobin, crystalline hemoglobin, amorphous heme and crystalline heme, including a reducing agent which maintains the hemoglobin or heme in the ferrous state and being in a stoichiometric excess, with regard to the iron in said hemoglobin or heme.

8. A filter medium as recited in claim 7, wherein said filter medium is hemoglobin and said reducing agent is ascorbic acid.

9. A filter medium as recited in claim 7, wherein said filter medium is hemoglobin and said reducing agent is methylene blue.

10. A filter as recited in claim 7, and including means for supporting said filter medium, said support means including a window portion aligned with said filter medium to permit visual examination of said filter medium.

11. A filter as recited in claim 10, wherein said window is positioned in alignment with at least the portion of said filter medium adapted to be proximate the smoker.

12. A filter as recited in claim 10, wherein said filter medium is prepared so that it will assume a distinctive color upon exposure to a predetermined quantity of carbon monoxide.

13. A filter as recited in claim 12, wherein said color is a cherry red.

14. A filter as recited in claim 10, wherein said support means includes a chamber for receiving said filter medium and means for providing access to said chamber for the replacement of said filter medium.

15. A filter as recited in claim 7, wherein said filter medium is formed from amorphous or crystalline hemoglobin at an acid pH.

16. A filter as recited in claim 15, wherein said hemoglobin is formed at about pH 4.

17. A filter as recited in claim 7, wherein said filter medium is formed from amorphous or crystalline hemoglobin at an alkaline pH.

18. A filter as recited in claim 17, wherein said hemoglobin is formed at about pH 9.

19. An air filter comprising support means and a filter medium carried by said support means, said filter medium being selected from the group consisting of amorphous hemoglobin, crystalline hemoglobin, amorphous heme and crystalline heme, including a reducing agent which maintains the hemoglobin or heme in the ferrous state and being in a stoichiometric excess, with regard to the iron in said hemoglobin or heme.

20. A filter medium as recited in claim 19, wherein said filter medium is hemoglobin and said reducing agent is ascorbic acid.

21. A filter medium as recited in claim 19, wherein said filter medium is hemoglobin and said reducing agent is methylene blue.

22. An air filter as recited in claim 19, wherein said support means includes window means to permit viewing of said filter medium.

23. A filter as recited in claim 19, including detecting means for detecting a predetermined change in selected characteristics of said filter medium indicative of the exposure of said filter medium to a predetermined quantity of carbon monoxide.

24. A filter as recited in claim 23, wherein said detecting means includes light sensitive means adapted to detect changes in color of said filter medium.

25. A filter as recited in claim 23, including infrared sensitive means adapted to detect changes in infrared wave absorption characteristics of said filter medium.

26. A filter as recited in claim 23, wherein said support means includes filter medium replacement means responsive to said detecting means and operative to replace said filter medium upon detection by said detecting means of the exposure of said filter medium to a predetermined quantity of carbon monoxide.

27. A filter as recited in claim 19, wherein said filter medium is formed from amorphous hemoglobin or heme as a sheet, said support means including a pair of spaced roller means for supporting a portion of said sheet filter medium in the path of said air, said support means including means for coordinately rotating said pair of roller means for positioning successive incremental lengths of said sheet filter medium in the path of said air.

28. A filter as recited in claim 19 and including blower means for the selective direction of relatively carbon monoxide-free air or oxygen against said filter medium for the regeneration thereof.

29. A filter arrangement comprising a filter medium selected from the group consisting of hemoglobin and heme, including a reducing agent which maintains the hemoglobin or heme in the ferrous state and being in a stoichiometric excess, with regard to the iron in said hemoglobin or heme; and detecting means for detecting a predetermined change in selected characteristics of said filter medium indicative of the exposure of said filter medium to a predetermined quantity of carbon monoxide.

30. A filter medium as recited in claim 29, wherein said filter medium is hemoglobin and said reducing agent is ascorbic acid.

31. A filter medium as recited in claim 29, wherein said filter medium is hemoglobin and said reducing agent is methylene blue.

32. A filter arrangement as recited in claim 29, wherein said detecting means includes light sensitive means adapted to detect changes in color of said filter medium.

33. A filter arrangement as recited in claim 29, wherein said detecting means includes infrared sensitive means adapted to detect changes in infrared wave absorption characteristics of said filter medium.

34. A filter arrangement as recited in claim 29, and including support means, said support means including filter medium replacement means responsive to said detecting means and operative to replace said filter medium upon detection by said detecting means of the exposure of said filter medium to a predetermined quantity of carbon monoxide.

35. A carbon monoxide detection arrangement comprising a filter medium selected from the group consisting of hemoglobin and heme, including a reducing agent which maintain the hemoglobin or heme in the ferrous state and being in a stoichiometric excess, with regard to the iron in said hemoglobin or heme; detecting means for detecting a predetermined change in selected characteristics of said filter medium indicative of the exposure of said filter medium to a predetermined quantity of carbon monoxide; and alarm means responsive to said detecting means for providing an alarm in the presence of said predetermined quantity of carbon monoxide.

36. A detection arrangement as recited in claim 35, wherein said filter medium is hemoglobin and said reducing agent is ascorbic acid.

37. A filter medium as recited in claim 35, wherein said filter medium is hemoglobin and said reducing agent is methylene blue.

38. A filter arrangement as recited in claim 35, wherein said detecting means includes light sensitive means adapted to detect changes in color of said detection medium.

39. A filter arrangement as recited in claim 35, wherein said detecting means includes infrared sensitive means adapted to detect changes in infrared wave absorption characteristics of said detection medium.

* * * * *